United States Patent [19]

Suthers

[11] Patent Number: 4,488,126
[45] Date of Patent: Dec. 11, 1984

[54] EQUALIZER ARRANGEMENT FOR MIXED-GAUGE CABLES

[75] Inventor: Mark S. Suthers, Lanark, Canada

[73] Assignee: Northern Telecom Limited, Montreal, Canada

[21] Appl. No.: 442,594

[22] Filed: Nov. 18, 1982

[51] Int. Cl.³ .......................... H03H 7/03; H04B 3/04
[52] U.S. Cl. ..................................... 333/18; 178/63 E; 375/11; 333/28 R
[58] Field of Search ................. 333/18, 28 R; 375/11, 375/14, 16; 330/138, 280; 178/63 E, 69 R, 69 M; 358/905

[56] References Cited

U.S. PATENT DOCUMENTS

| | | | |
|---|---|---|---|
| 3,122,729 | 2/1964 | Bothwell et al. | 178/69 R X |
| 3,336,539 | 8/1967 | Kwartiroff et al. | 333/28 R X |
| 3,568,100 | 3/1971 | Tarbox | 333/28 R X |
| 3,582,832 | 6/1971 | Junge et al. | 333/18 |
| 3,728,649 | 4/1973 | Waldhauer | 333/18 |
| 4,208,640 | 6/1980 | Van der Meijs | 333/18 |

Primary Examiner—Paul Gensler
Attorney, Agent, or Firm—R. John Haley

[57] ABSTRACT

An equalizer arrangement comprises a fixed-characteristic equalizer which is supplemented by a variable-amplitude notch equalizer to enable proper equalization of signals transmitted via cables of arbitrarily mixed cable gauges. Automatic control of the notch amplitude is provided by detecting a predetermined signal level in the equalized signal, comparing this with its correct value, and controlling an up/down counter accordingly. The count of the counter determines a current flow through a diode which constitutes a variable resistance of the equalizer.

7 Claims, 7 Drawing Figures

EQUALIZER ARRANGEMENT FOR MIXED-GAUGE CABLES

This invention relates to equalizer arrangements.

It is known to provide an equalizer for equalizing signals received via a transmission cable to compensate for loss-frequency characteristics of the cable. It is generally desired, for reasons of cost and simplicity, to use an equalizer which has a fixed equalization characteristic. However, such an equalizer enables proper equalization to be achieved only for a specific gauge of cable, because the loss-frequency characteristics of the cable change for different gauges of cable.

For the transmission of data it is desirable to be able to use existing telecommunications cables. However, the nature of any particular cable transmission link established for such transmission is arbitrary; it may typically comprise an undetermined mixture of 22, 24, and/or 26 gauge PIC (plastic insulated conductor) cable with arbitrary lengths. The use of a fixed-characteristic equalizer for equalizing signals received via such cables is insufficient for proper equalization regardless of the cable mixture, and the use of a complicated variable equalizer in place of the fixed-characteristic equalizer is undesired in view of the cost and complexity of such an equalizer. Furthermore, individual manual adjustment of equalizers to suit particular transmission links is desirably avoided.

Accordingly, an object of this invention is to provide an improved equalization arrangement for equalizing signals received via arbitrary cable mixtures.

According to this invention there is provided an equalizer arrangement comprising a first equalizer having a fixed, predetermined, equalization characteristic for equalizing signals transmitted via cable of a predetermined gauge, a second, variable amplitude notch equalizer coupled in series with the first equalizer for complementing the equalization of signals by the first equalizer to equalize signals transmitted via cable of a different gauge, and control means responsive to the equalized signals for automatically controlling the equalization by the second equalizer.

Thus in accordance with this invention a conventional fixed-characteristic equalizer can be supplemented by a variable notch equalizer to enable proper equalization of signals transmitted via various cable mixtures. As each of the equalizers can have a simple form, and automatic control of the variable amplitude notch can be provided easily and simply as described below, this provides a particularly convenient way of effecting equalization.

Conveniently the second equalizer comprises a variable resistance which is controlled by the control means to vary the amplitude of the notch. The variable resistance can be constituted by a diode and means for establishing a controlled current through the diode. In this case preferably the control means comprises means for detecting a predetermined sequence of the equalized signals, means for comparing the level of the equalized signals with at least one reference level, and means responsive to the detection and the comparison for controlling the current through the diode.

The invention will be further understood from the following description with reference to the accompanying drawings, in which.

Figure 1:
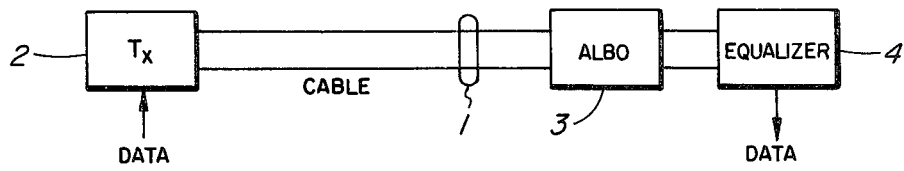
FIG. 1 is a block diagram illustrating a conventional equalizing arrangement.
Figure 3:
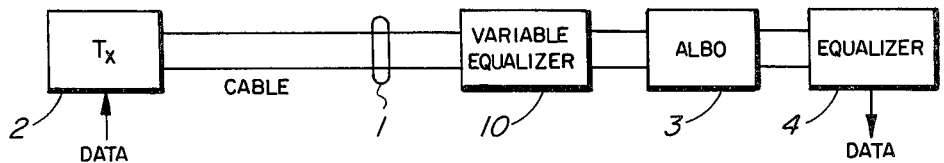
FIG. 3 is a block diagram illustrating an equalizing arrangement according to an embodiment of this invention.
Figure 6:
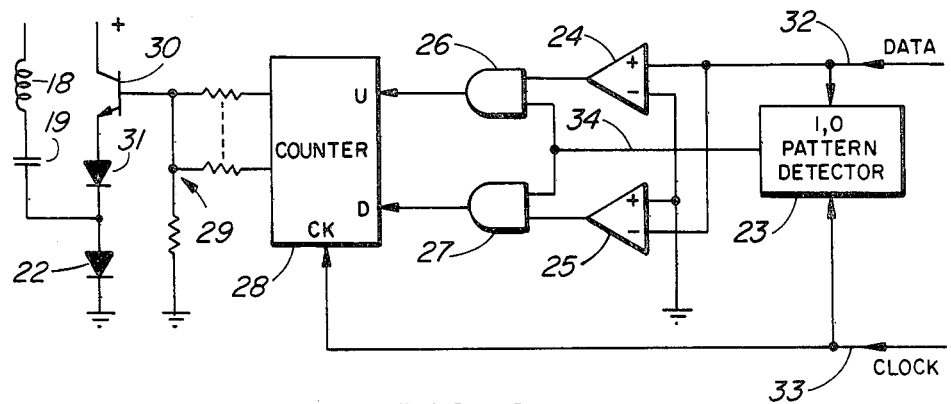
Figure 7:
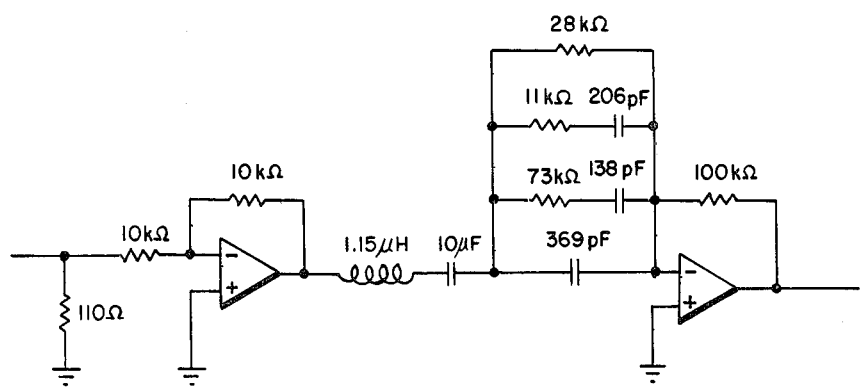

FIG. 6 schematically illustrates an automatic control arrangement for the variable equalizer; and FIG. 7 is a schematic circuit diagram illustrating a form of the fixed equalizer in the arrangements of FIGS. 1 and 3.

Referring to FIG. 1, a conventional arrangement is shown for transmitting data, for example using duobinary or bipolar signals at a bit rate of 640 kbps, via a cable 1, and for equalizing the received signals to compensate for characteristics of the cable. To this end, the cable 1 is connected at one end to a data signal transmitter 2 and at the other end, via an automatic line build-out (ALBO) circuit 3, to an equalizer 4 from which the received data signals are derived. The ALBO circuit 3, which is of known form, serves to equalize the amplitude, at a predetermined frequency, of the data signals to accommodate cables of various lengths and hence attenuations. For example the ALBO circuit equalizes the amplitude to provide a total loss of 51 dB via the cable 1 and circuit 3 for signals at the Nyquist frequency of 320 kHz.

Figure 2:
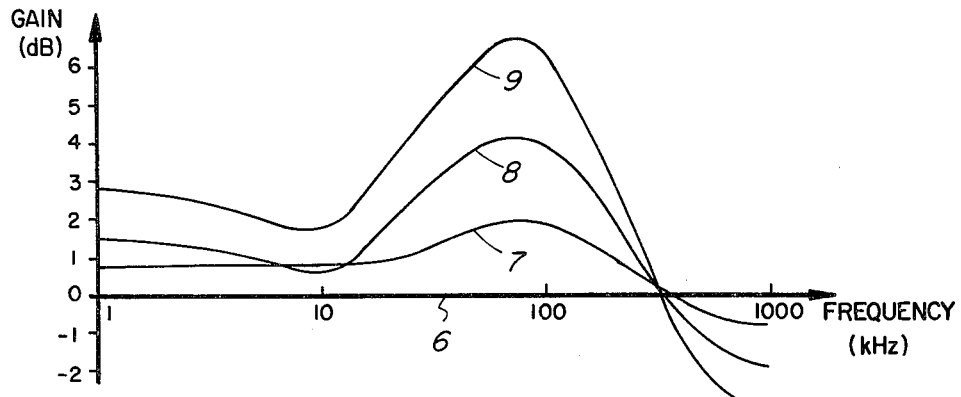
FIG. 2 is a graph illustrating responses of the arrangement of FIG. 1.

The equalizer 4 serves to compensate for the loss-frequency characteristics of the cable 1. For example the equalizer 4 may be designed to compensate for the loss-frequency characteristics of 26 PIC (26 gauge plastic insulated conductor) cable, so that if the cable 1 is all 26 PIC the resultant gain-frequency characteristic of the equalized data signals is flat as shown by the line 6 in FIG. 2. However, in practice the make-up of the particular cable 1 which is used is unknown; it may typically comprise a mixture of arbitrary lengths of 26 PIC, 24 PIC, and 22 PIC, with an overall loss-frequency characteristic which differs considerably from that of all-26 PIC cable. For example FIG. 2 also shows by lines 7, 8, and 9 the gain-frequency characteristics of the equalized data signals, assuming that the equalizer 4 is designed as mentioned above, for situations where the cable 1 consists of respectively 1 mile of 22 PIC and the remainder 26 PIC, 2 miles of 22 PIC and the remainder 26 PIC, and all (3.5 miles) 22 PIC.

In order to compensate for these variable gain-frequency characteristics resulting from arbitrary mixtures of cable gauges, the present invention provides as shown in FIG. 3 an additional variable equalizer 10, which is connected in this case in series between the cable 1 and the ALBO circuit 3. The equalizer 10 could alternatively be connected following either the circuit 3 or the equalizer 4. To compensate for the situations discussed above and represented by the gain-frequency lines 6 to 9 in FIG. 2, the equalizer 10 is arranged to have gain-frequency responses as shown by the lines 11 to 14 respectively in FIG. 4, whereby the equalized data signals have a substantially flat gain-frequency characteristic regardless of the make-up of the cable 1.

Figure 4:
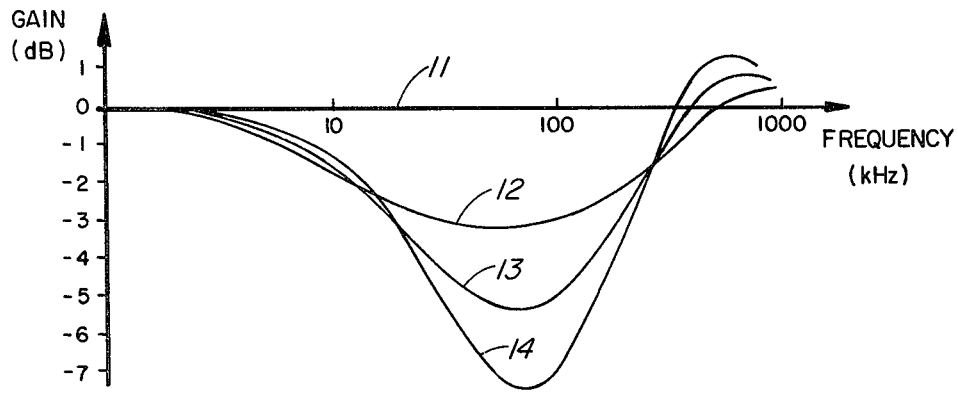
FIG. 4 is a graph illustrating responses of a variable equalizer in the arrangement of FIG. 3.
Figure 5:
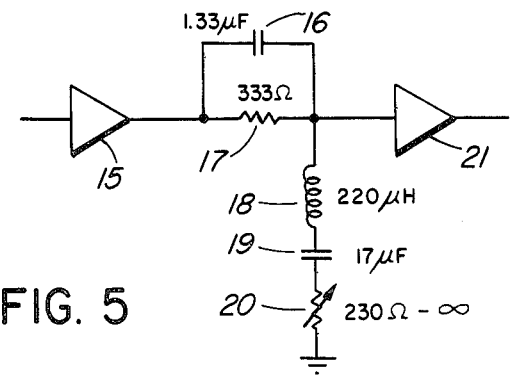
FIG. 5 is a schematic circuit diagram illustrating one form of the variable equalizer.

To produce the responses shown in FIG. 4, the equalizer 10 is a variable notch equalizer of the form shown in FIG. 5, comprising an input buffer amplifier 15, a series circuit comprising a parallel-connected capacitor 16 and resistor 17, a subsequent shunt circuit comprising a series-connected inductor 18, capacitor 19, and variable resistance 20 connected to circuit ground, and an output buffer amplifier 21. The component values indicated in FIG. 5 are for the bit rate mentioned above. To produce the response lines 11 to 14 the resistance 20 has a value of respectively ∞, 760Ω, 392Ω, and 231Ω.

As illustrated in FIG. 6, the variable resistance 20 can be conveniently constituted by a diode 22 which is supplied with a controlled forward current. This arrangement enables the effective resistance to be varied automatically to compensate for different cable loss-frequency characteristics and hence different cable mixtures, using a suitable automatic control arrangement such as that illustrated in FIG. 6 and described below. FIG. 6 also shows the inductor 18 and the capacitor 19 of the variable notch equalizer of FIG. 5. Instead of a diode as described here a varistor or other variable resistance element may be used and suitably controlled to constitute the resistance 20.

The control arrangement illustrated in FIG. 6 comprises a pattern detector 23, two comparators 24 and 25, two AND gates 26 and 27, an up-down counter 28, a weighted resistance summing network 29, a transistor 30, and a diode 31. The pattern detector 23 is supplied with the received bipolar data signal on a line 32, and with a recovered clock signal on a line 33, and serves to detect each 1, 0 sequence in the received data to produce an output signal on a line 34, enabling the AND gates 26 and 27, during each data 0 which follows a data +1 signal. The comparators 24 and 25 compare the actual data signal level on the line 32 with the correct, zero (circuit ground), level which should occur during each data 0. If, during a data 0 following a data +1, the actual data signal level on the line 32 is positive or negative, the comparator 24 or 25 respectively produces an output signal which is passed by the enabled gate 26 or 27 respectively and applied to an up input U or down input D respectively of the counter 28 to cause the counter to count a pulse of the clock signal on the line 33 respectively up or down. The most significant bit outputs of the counter 28 are summed by the network 29 to control the current conducted by the transistor 30, and hence by the diodes 31 and 22, according to the count of the counter, thereby controlling the characteristic of the variable notch equalizer 10 to reduce the data 0 error in the received and equalized data to a low level.

The use of only the most significant bit outputs of the counter 28 to control the transistor 30, and not all of the bit outputs, provides an averaging effect in the control loop for the equalizer 10 so that this is not continuously adjusted. Obviously adjustment of the equalizer can be effected in dependence upon other data signal patterns and/or other data signal levels, as desired.

For completeness, FIG. 7 illustrates a possible form of the fixed equalizer 4, the component values shown being for the data rate mentioned above, for 26 PIC cable. No further description of this equalizer is believed to be necessary here.

Numerous modifications, variations, and adaptations to the particular embodiments of the invention described above may be made without departing from the scope of this invention, which is defined in the claims.

What is claimed is:

1. An equalizer arrangement comprising a first equalizer having a fixed, predetermined, equalization characteristic for equalizing signals transmitted via cable of a predetermined gauge, a second variable amplitude notch equalizer coupled in series with the first equalizer for complementing the equalization of signals by the first equalizer to equalize signals transmitted via cable of a different gauge, and control means responsive to the equalized signals for automatically controlling the equalization by the second equalizer.

2. An arrangement as claimed in claim 1 wherein the second equalizer comprises a variable resistance which is controlled by the control means to vary the amplitude of the notch.

3. An arrangement as claimed in claim 2 wherein the variable resistance is constituted by a diode and means for establishing a controlled current through the diode.

4. An arrangement as claimed in claim 1 wherein the control means comprises means for detecting a predetermined sequence of the equalized signals, means for comparing the level of the equalized signals with at least one reference level, and means responsive to the detection and the comparison for automatically controlling the equalization by the second equalizer.

5. An arrangement as claimed in claim 3 wherein the control means comprises means for detecting a predetermined sequence of the equalized signals, means for comparing the level of the equalized signals with at least one reference level, and means responsive to the detection and the comparison for controlling the current through the diode.

6. An arrangement as claimed in claim 5 wherein the means for controlling the current through the diode comprises an up/down counter whose count is changed in dependence upon the detection and the comparison and determines the current through the diode.

7. A method of equalizing signals comprising the steps of:
passing the signals through a first equalizer having a fixed, predetermined, equalization characteristic for equalizing signals transmitted via cable of a predetermined gauge;
passing the signals through a second variable amplitude notch equalizer, coupled in series with the first equalizer, for complementing the equalization by the first equalizer to equalize signals transmitted via cable of a different gauge; and
controlling the equalization by the second equalizer automatically in response to the equalized signals.

* * * * *